G. J. CLAYTON.
DEMOUNTABLE RIM.
APPLICATION FILED MAY 24, 1919.
1,321,888.
Patented Nov. 18, 1919.
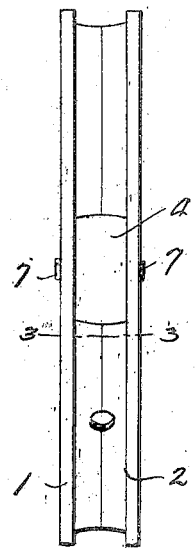
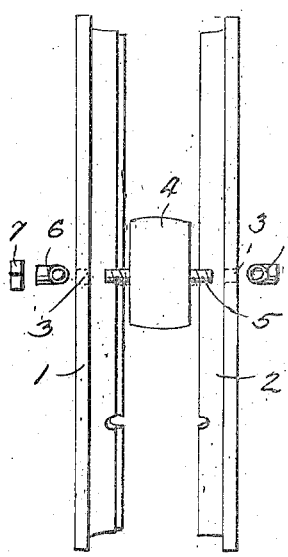
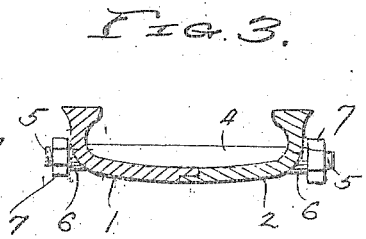
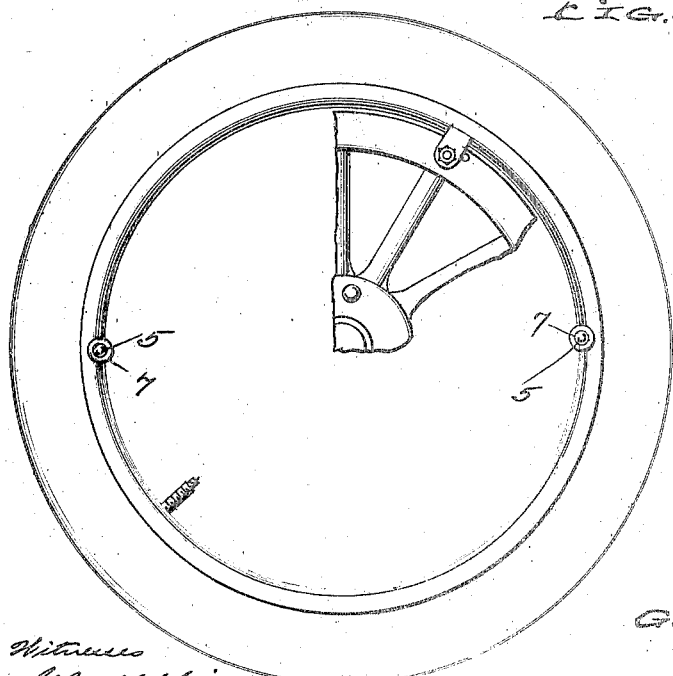
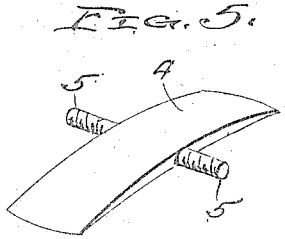
Inventor
George J. Clayton

UNITED STATES PATENT OFFICE.

GEORGE J. CLAYTON, OF LAKEWOOD, NEW JERSEY.

DEMOUNTABLE RIM.

1,321,888.     Specification of Letters Patent.     Patented Nov. 18, 1919.

Application filed May 24, 1919. Serial No. 299,415.

*To all whom it may concern:*

Be it known that I, GEORGE J. CLAYTON, a citizen of the United States, residing at Lakewood, in the county of Ocean and State of New Jersey, have invented certain new and useful Improvements in Demountable Rims, of which the following is a specification.

The invention has for its object to enable a tire to be readily placed in position or easily removed from a vehicle wheel as occasion may require, the invention relating to pneumatic tires and rims coöperating therewith and which necessitate frequent removal of the tire for various causes.

In accordance with the present invention, the rim which is demountable comprises complemental parts which are separable, each part having a flange at its outer edge between which the tire is secured when the parts are placed together.

The drawing illustrates a preferred embodiment of the invention. However, it is to be understood that in adapting the same to meet different conditions, various changes in the form, proportion, and minor details of construction may be resorted to without departing from the nature of the invention as claimed hereinafter.

In the accompanying drawing,

Figure 1 is an edge view of a demountable rim embodying the invention, showing the complemental parts secured.

Fig. 2 is a view similar to Fig. 1, showing the parts separated.

Fig. 3 is a transverse section on the line 3—3 of Fig. 1, the parts being illustrated on a large scale.

Fig. 4 is a side view of the rim with a tire in position and showing a portion of a wheel.

Fig. 5 is a detail perspective view of one of the ties, whereby the parts of the rim are connected.

Corresponding and like parts are referred to in the following description and indicated in the several views of the drawing by like reference characters.

The rim comprises similar parts 1 and 2, each being provided at its outer edge with a retaining flange for confining the tire and the two parts having their inner edges jointed to insure their alining. As illustrated most clearly in Fig. 3, the inner edges of the parts 1 and 2 are connected by means of an overlapping joint, the parts being halved or rabbeted. When the parts 1 and 2 are separated, a tire may be easily removed from the rim or applied thereto, no matter what may be the formation of the confining flanges and whether the tire has straight or beaded edges. At suitable intervals in the circumferential length of the rim, openings 3 are formed in the side walls. A plate 4 is provided for each set of openings and is disposed upon the outer face of the parts 1 and 2 between the side flanges thereof, as indicated most clearly in Figs. 1 and 3. The plate 4 is oblong and tapers from the middle point toward opposite ends. The outer side of the plate 4 is straight between its longitudinal edges, whereas its inner side or that adjacent the rim is transversely convex to conform to the transverse curvature of the outer side of the rim. The plate 4 is of a width corresponding to the distance between the flanges of the rim when the parts 1 and 2 are assembled. Projections 5 extend from opposite edges of the plate 4 and are disposed midway the ends of the plate. The projections 5 are externally threaded and are adapted to pass through registering openings 3. Each projection 5 receives a washer 6 and a nut 7. The inner face of the washers 6 conform to the outer walls of the rim, whereas the outer ends of the washers are placed to receive the binding action of the nuts 7 by means of which the parts 1 and 2 are drawn together and made secure.

The plate 4 with its lateral threaded extensions 5 constitute a tie by means of which the parts 1 and 2 are held together in conjunction with the washers 6 and nuts 7. When the nuts and washers are removed the parts 1 and 2 comprising the rim may be separated, thereby admitting of the tire being easily, quickly and conveniently placed in position or removed from the rim. When the tire is in position the parts 1 and 2 of the rim are brought together and are made secure by placing the washers 6 and nuts 7 in position and tightening the nuts. The plates 4 constitute guides and supporting means for the tire, thereby greatly facilitating the assembling of the parts when placing a tire in position upon the rim and bringing the parts 1 and 2 together after the tire has been placed in position. The construction is such as to enable the work to be performed with despatch and without any material effort or annoyance.

The foregoing description and the drawing have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent is:—

1. A demountable rim, comprising complemental parts; each part having a tire retaining flange at its outer edge and the two parts having their inner edges adapted to be connected by means of an overlapping joint, plates disposed against the outer side of the rim and overlapping the joint formed between the parts, said plates tapering from the middle point toward opposite ends and having their inner sides transversely convex to conform to the outer concave side of the rim and means for securing the parts of the rim when assembled.

2. A demountable rim, comprising complemental parts, each part having a tire retaining flange at its outer edge and the two parts having their inner edges adapted to be connected by means of an overlapping joint, plates disposed against the outer side of the rim and overlapping the joint formed between the parts thereof and formed with lateral extensions which are externally threaded and nuts mounted upon the threaded projections of the plate to draw the parts of the rim together.

3. A demountable rim, comprising complemental parts, each part having a tire retaining flange at its outer edge and the two parts having their inner edges adapted to be connected by means of an overlapping joint, and plates placed against the outer side of the rim and tapering from the middle point toward opposite ends and formed with lateral threaded projections to pass through openings in the side walls of the rim and washers and nuts mounted upon the threaded projections of the plates to hold the parts in position.

In testimony whereof I affix my signature in presence of two witnesses.

GEORGE J. CLAYTON.

Witnesses:
W. B. CLAYTON,
ARTHUR CLAYTON.